US010756561B2

(12) United States Patent
Lin et al.

(10) Patent No.: US 10,756,561 B2
(45) Date of Patent: Aug. 25, 2020

(54) INTELLIGENT ELECTRONIC PRODUCT HAVING WIRELESS CHARGING FUNCTION

(71) Applicants: Inventec (Pudong) Technology Corporation, Shanghai (CN); INVENTEC CORPORATION, Taipei (TW)

(72) Inventors: Chun-Chi Lin, Taipei (TW); Ying-Shan Chen, Taipei (TW)

(73) Assignees: INVENTEC (PUDONG) TECHNOLOGY CORPORATION, Shanghai (CN); INVENTEC CORPORATION, Taipei (TW)

( * ) Notice: Subject to any disclaimer, the term of this patent is extended or adjusted under 35 U.S.C. 154(b) by 72 days.

(21) Appl. No.: 16/167,749

(22) Filed: Oct. 23, 2018

(65) Prior Publication Data

US 2019/0252901 A1 Aug. 15, 2019

(30) Foreign Application Priority Data

Feb. 14, 2018 (CN) .......................... 2018 1 0151963

(51) Int. Cl.
*H02J 7/02* (2016.01)
*G06F 1/16* (2006.01)
*H02J 50/90* (2016.01)
*H02J 7/00* (2006.01)
*H02J 50/10* (2016.01)

(52) U.S. Cl.
CPC .............. *H02J 7/025* (2013.01); *G06F 1/163* (2013.01); *H02J 7/0027* (2013.01); *H02J 7/0044* (2013.01); *H02J 50/10* (2016.02); *H02J 50/90* (2016.02)

(58) Field of Classification Search
CPC .......... H02J 7/0027; H02J 50/90; H02J 7/025; H02J 7/0044; H02J 50/10; G06F 1/163
See application file for complete search history.

(56) References Cited

U.S. PATENT DOCUMENTS

2018/0054077 A1* 2/2018 Brzezinski .............. H02J 50/90

FOREIGN PATENT DOCUMENTS

CN 105747412 A * 7/2016

* cited by examiner

*Primary Examiner* — Jared Fureman
*Assistant Examiner* — Duc M Pham
(74) *Attorney, Agent, or Firm* — Locke Lord LLP; Tim Tingkang Xia, Esq.

(57) ABSTRACT

The invention provides an intelligent electronic product including a wearable device, a seat, a wireless charging device and a first magnet set. The wearable device includes a main bead and sub-beads connected to the main bead. The seat has an accommodating space. The wireless charging device includes a wireless power receiving module located in the main bead and a wireless power transmitting module located in the seat. The first magnet set includes a first magnet located in the main bead and a second magnet located in the seat which have opposite magnetic poles. When the main bead is accommodated in the accommodating space, the first magnet and the second magnet attract to position the main bead in a charging position, such that the wireless power receiving module and the wireless power transmitting module form a wirelessly charging loop for wirelessly charging the main bead.

8 Claims, 7 Drawing Sheets

INTELLIGENT ELECTRONIC PRODUCT HAVING WIRELESS CHARGING FUNCTION

CROSS-REFERENCE TO RELATED APPLICATIONS

This non-provisional application claims priority under 35 U.S.C. § 119(a) on Patent Application No(s). 201810151963.X filed in China on Feb. 14, 2018, the entire contents of which are hereby incorporated by reference.

BACKGROUND OF THE INVENTION

Technical Field of the Invention

The invention relates to an intelligent electronic product, more particularly to an intelligent electronic product having wireless charging function.

Description of the Related Art

An intelligent wearable device is a device that can be worn on the human body or integrated into clothes and can monitor and record physical activity and sensitive health information in a fast and responsive manner. According to market reports, wearable devices are considered to be the most potential electronic products after the smartphones. Therefore, more and more technologies have been applied to the wearable device market in recent years.

Generally, intelligent wearable devices are in a form of, for example, bracelets or necklaces that can be worn on the wrist or neck. Current bracelet-type and necklace-type wearable devices in the market all have plugs such as pogo pins for charging. To connect the wearable device to contacts of a charging seat, the pogo pins must be disposed on the surfaces of the device, conversely making it not good for the visual design of the device. In addition, the charging starts only when the device is correctly placed on the charging seat meaning the pogo pins and the contacts are precisely connected, and this is inconvenient for users. Another negative aspect is that the pogo pin module occupies a large volume, therefore a certain amount of space for the pogo pin module must be allocated during the design process, such that the overall size of the device cannot be reduced.

SUMMARY

One embodiment of the invention provides an intelligent electronic product having wireless charging function, including a wearable device, a seat, a wireless charging device and a first magnet set. The wearable device includes a main bead and a plurality of sub-beads. The main bead is connected to the sub-beads so as to form a ring-shaped structure with the sub-beads. The seat has an accommodating space, and the main bead is removably accommodated in the accommodating space. The wireless charging device includes a wireless power receiving module and a wireless power transmitting module. The wireless power receiving module is located in the main bead, and the wireless power transmitting module is located in the seat. The first magnet set includes a first magnet and a second magnet which have opposite magnetic poles. The first magnet is located in the main bead, and the second magnet is located in the seat and close to the accommodating space. When the main bead is accommodated in the accommodating space, the first magnet and the second magnet attract each other so as to position the main bead in a charging position, such that the wireless power receiving module and the wireless power transmitting module form a wirelessly charging loop for wirelessly charging the main bead.

BRIEF DESCRIPTION OF THE DRAWINGS

The present invention will become better understood from the detailed description given hereinbelow and the accompanying drawings which are given by way of illustration only and thus are not intending to limit the present invention and wherein.

DETAILED DESCRIPTION

Figure 1:
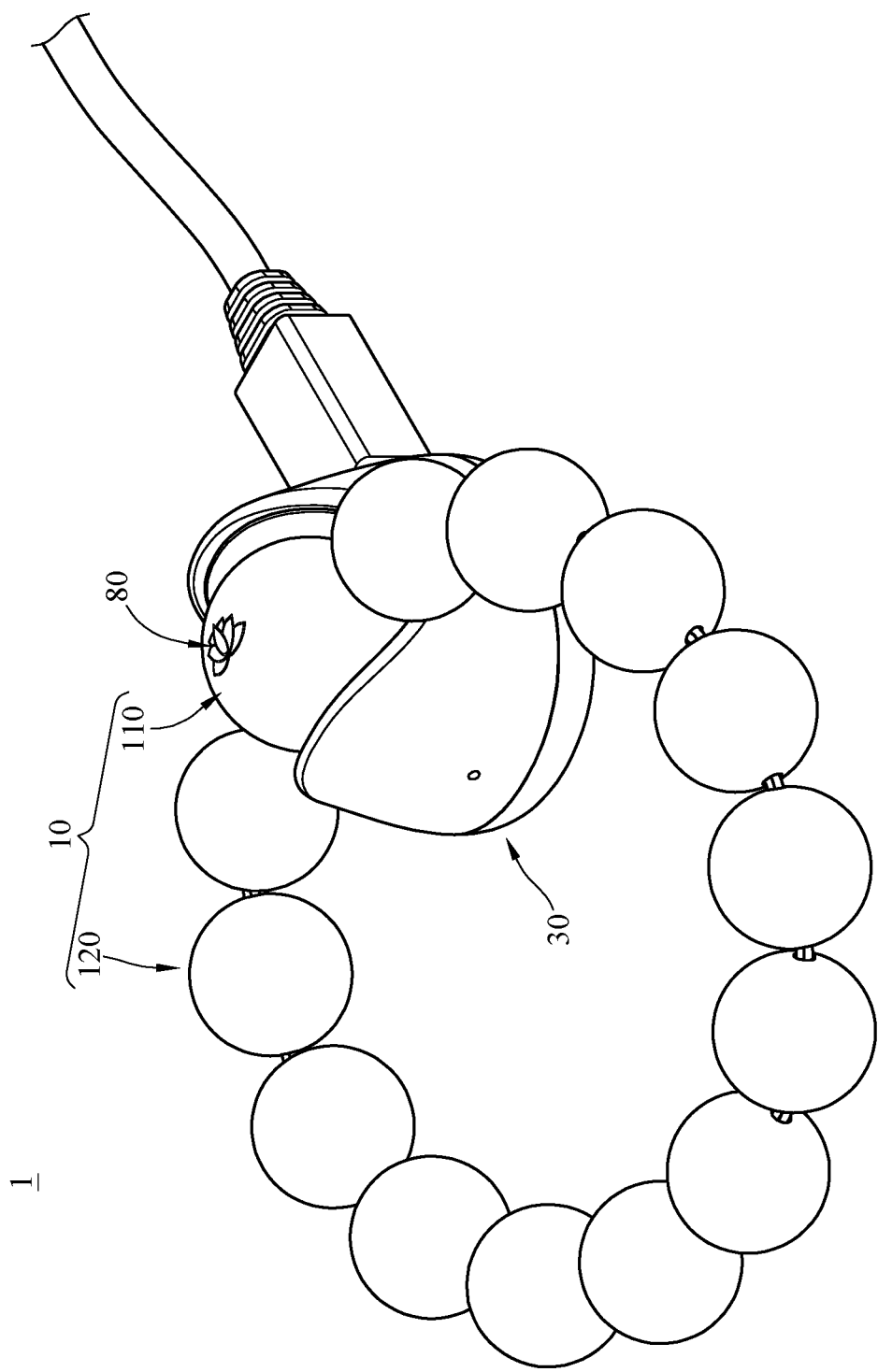
FIG. 1 is a perspective view of a front panel assembly of a computer case according to one embodiment of the invention.

In the following detailed description, for purposes of explanation, numerous specific details are set forth in order to provide a thorough understanding of the disclosed embodiments. It will be apparent, however, that one or more embodiments may be practiced without these specific details. In other instances, well-known main structures and devices are schematically shown in order to simplify the drawing.

In addition, embodiments of the present invention will be disclosed below by way of illustration, and for the sake of clarity, many practical details will be described in the following description. However, it should be understood that these practical details are not intended to limit the present invention. In addition, to simplify the drawings, some conventional structures and components are schematically illustrated in the drawings, and some of the drawings omit structures (wires, cables, etc.) so as to keep the drawing clean and simple.

Furthermore, unless being specifically defined, all terms used herein, including technical and scientific terms, have their common meanings, as those whose meanings can be understood by those skilled in the art. Further, the definition of the above terms should be interpreted in the present specification as having the same meaning as the technical field related to the present invention. Unless specifically defined, these terms are not to be interpreted as being too idealistic or formal.

Figure 2:
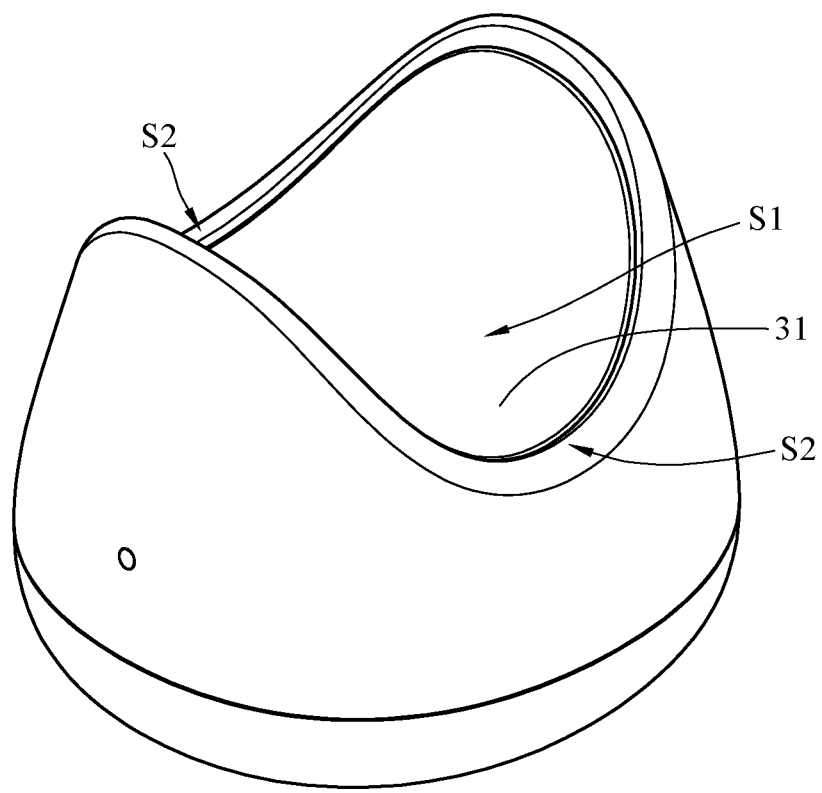
FIG. 2 is a perspective view of a seat in FIG. 1.
Figure 3:
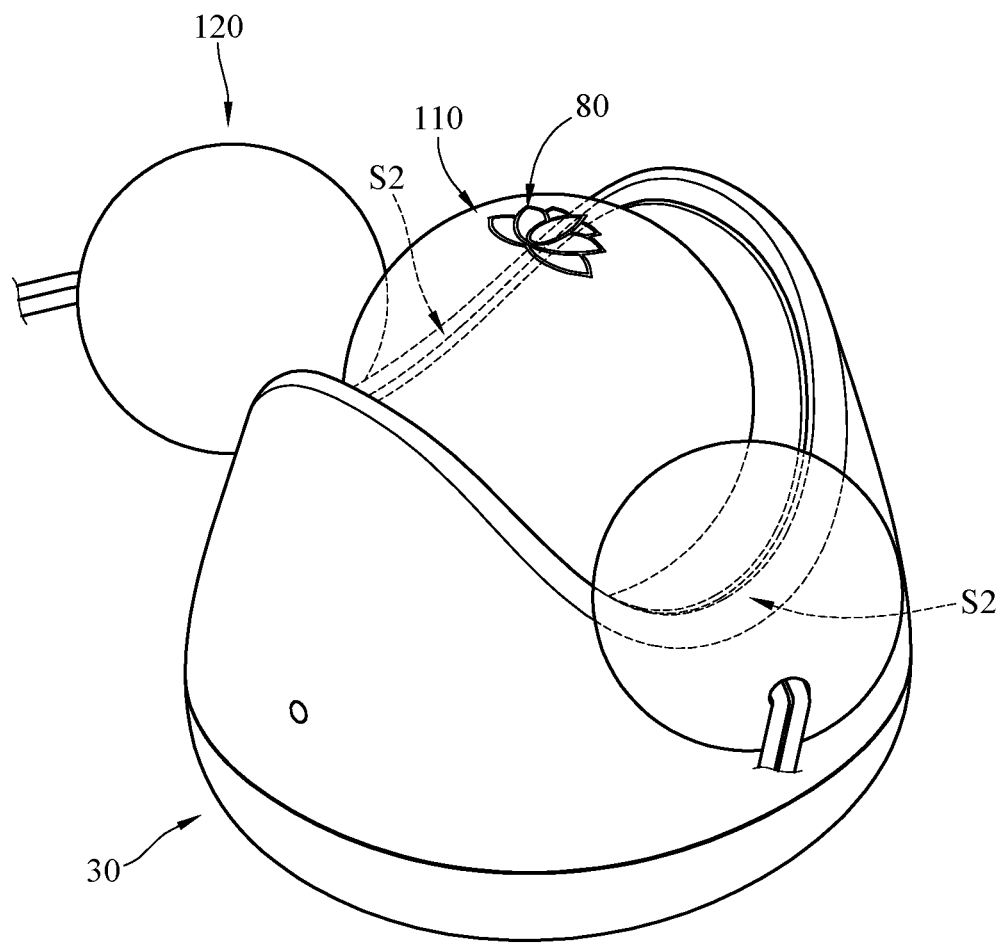
FIG. 3 is a partial enlarged view of the intelligent electronic product in FIG. 1.
Figure 4:
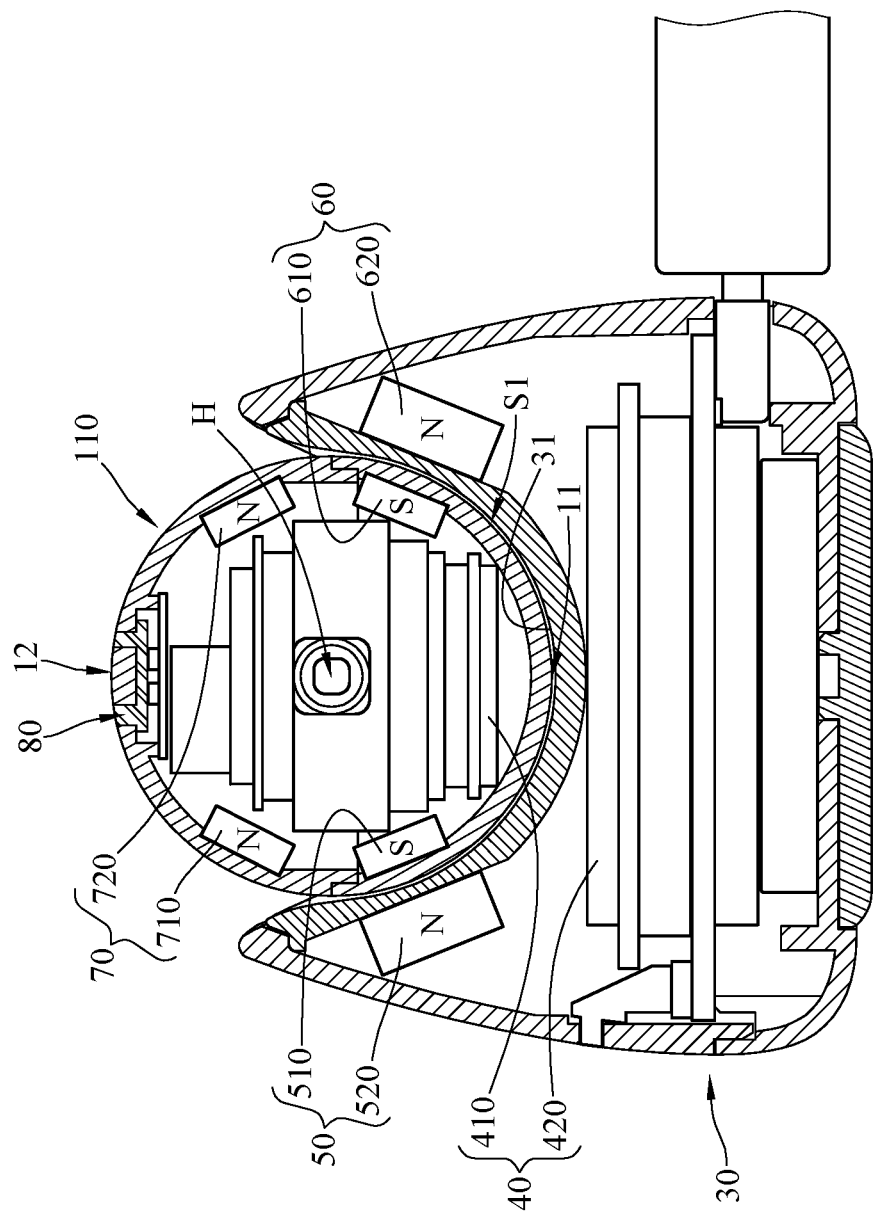
FIG. 4 is a partial enlarged cross-sectional view of the intelligent electronic product in FIG. 1.

Firstly, please refer to FIGS. 1-4, FIG. 1 is a perspective view of a front panel assembly of a computer case according to one embodiment of the invention, FIG. 2 is a perspective view of a seat in FIG. 1, FIG. 3 is a partial enlarged view of the intelligent electronic product in FIG. 1, and FIG. 4 is a partial enlarged cross-sectional view of the intelligent electronic product in FIG. 1.

This embodiment provides an intelligent electronic product 1 having wireless charging function. The intelligent electronic product 1 includes a wearable device 10, a seat 30 and a wireless charging device 40.

The wearable device 10 includes a main bead 110 and a plurality of sub-beads 120. The main bead 110 is a ball-shaped object, and it contains various electrical components (not shown) that can provide functions such as recording and counting repetitive movement of the main bead 110 or monitoring physical activity, but the present invention is not limited to the functions that the main bead 10 can provide. The sub-beads 120 are a plurality of another ball-shaped objects or beads (not numbered) which are smaller than the main bead 110. The main bead 110 is located between two of the sub-beads 120, and the main bead 110 and the sub-beads 120 are stringed together on a thread or cord (not numbered) so as to form a ring-shaped structure which can be worn around neck or limbs. The materials of the main bead 110 and the sub-beads 120 are not restricted. In this or some other embodiments, the wearable device 10 including the main bead 110 and the sub-beads 120 can be taken as a Buddhist prayer beads (or so called malas), a tool used to count the number of times a mantra is recited. However, the present invention is not limited to the shape formed by the main bead and the sub-beads. For example, in some other embodiments, the textures and the shapes of the main bead and the sub-beads and the overall appearance of these beads may be changed in order to fit the human body or the visual requirements.

The seat 30 has a supporting surface 31 on its top. The supporting surface 31 is a concave surface and it forms an accommodating space S1. The shape of the accommodating space S1 matches the shape of the main bead 110, such that the main bead 110 is able to be removably accommodated in the accommodating space S1. According to the position of the main bead 110 in the accommodating space S1, the main bead 110 can be in a charging position or a non-charging position.

In addition, the seat 30 further has two openings S2 which are respectively located at two opposite sides of the accommodating space S1. When the wearable device 10 is disposed on the seat 30, each of the openings S2 is located between the main bead 110 and one of the sub-beads 120 (as shown in FIG. 3). Furthermore, the surface of the seat 30 forming the opening S2 is a curved surface, thus the sub-beads 120 adjacent to the main bead 110 can be placed in an inclined position along the shapes of the openings S2 while the main bead 110 is placed in the accommodating space S1, making the intelligent electronic product 1 visually appealing.

The wireless charging device 40 includes a wireless power receiving module 410 and a wireless power transmitting module 420. The wireless power transmitting module 420 is configured to transmit wireless power to the wireless power receiving module 410, and the wireless power receiving module 410 is configured to receive wireless power from the wireless power transmitting module 420. In this embodiment, the wireless power receiving module 410 and the wireless power transmitting module 420 each is a set of coils. In addition, the main bead 110 has a first side 11 and a second side 12 opposite to each other, the wireless power receiving module 410 is located in the main bead 110 and located close to the first side 11, and the wireless power transmitting module 420 is located in the seat 30 and located close to the supporting surface 31.

When the main bead 110 is correctly placed in the accommodating space S1 (e.g., as shown in FIG. 3), the wireless power receiving module 410 and the wireless power transmitting module 420 are close to each other by a predetermined distance and are parallel to each other, such that the wireless power receiving module 410 and the wireless power transmitting module 420 are able to form a wireless wirelessly charging loop for charging the main bead 110. Since the main bead 110 can be charged via a wireless manner, the main bead 110 can have a clean appearance with no visible charging port, and this makes the wearable device 10 look simple and elegant.

However, it is noted that the present invention is not limited to the magnitude of the predetermined distance between the wireless power receiving module 410 and the wireless power transmitting module 420, any magnitude of the predetermined distance, that can enable the wireless power receiving module 410 and the wireless power transmitting module 420 to form the wirelessly charging loop, fall within the scope of the predetermined distance.

Moreover, comparing to the pogo pin module used in the conventional wearable electronic products, the wireless charging device 40 occupies less volume in the main bead 110, allowing the main bead 110 to be manufactured smaller so as to facilitate the overall design of the intelligent electronic product 1.

In addition, to ensure that the main bead 110 still can be wirelessly charged when it is incorrectly placed, the wireless power receiving module 410 is preferably narrower than the wireless power transmitting module 420.

Figure 5:
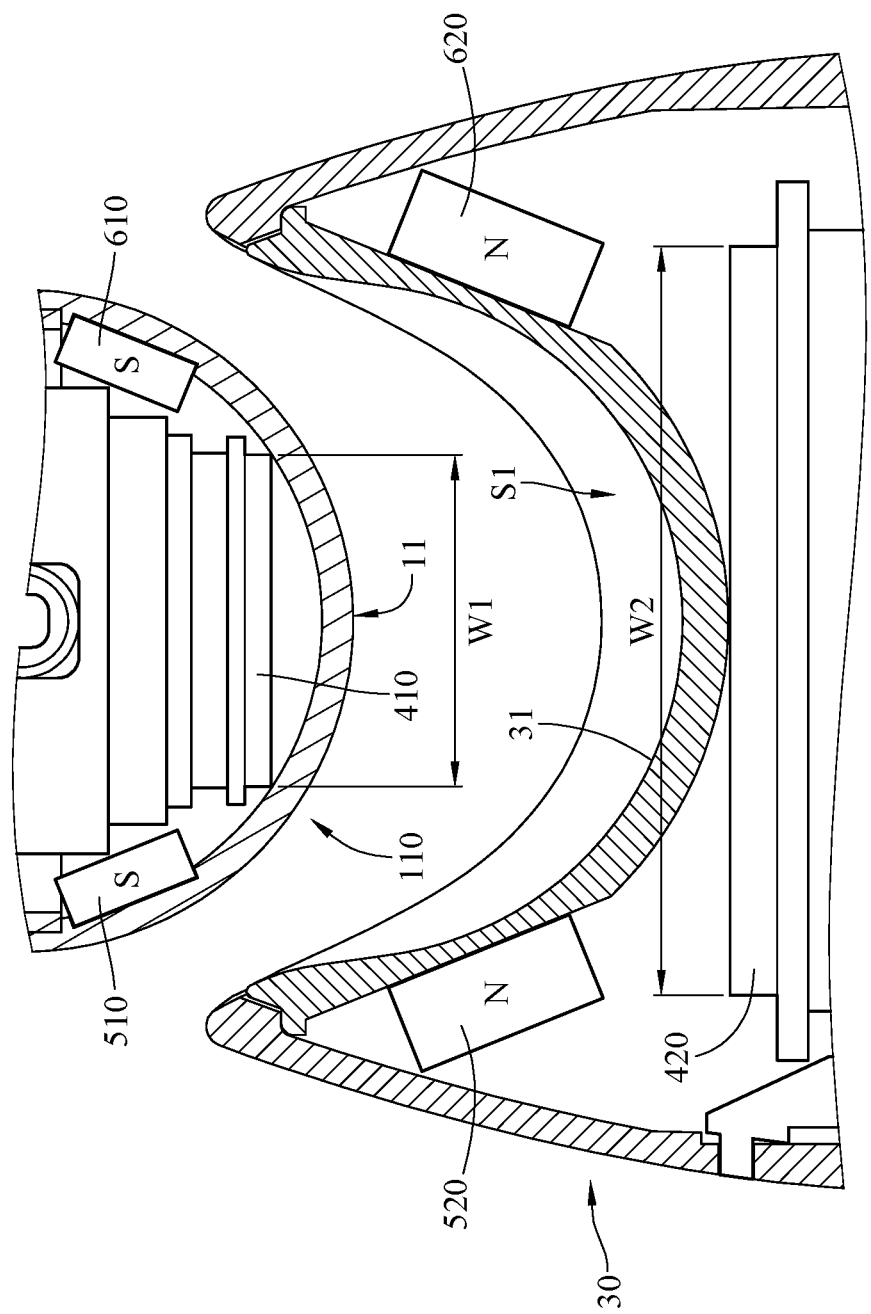
FIG. 5 is a partial enlarged view of FIG. 4.

In detail, please refer further to FIG. 5, FIG. 5 is a partial enlarged view of FIG. 4. In this embodiment, a width w1 of the wireless power receiving module 410 is less than a width w2 of the wireless power transmitting module 420. As a result, when the main bead 110 is slightly misplaced to cause the wireless power receiving module 410 not parallel to the wireless power transmitting module 420, the power receiving module 410 is still in the wireless power transmission range, such that the wireless power receiving module 410 and the wireless power transmitting module 420 still can form the wirelessly charging loop for wirelessly charging the main bead 110.

Then, please refer back to FIG. 4, in this embodiment, the intelligent electronic product 1 further includes a first magnet set 50, a second magnet set 60 and a third magnet set 70 for ensuring the correct placement of the main bead 110 on the seat 30.

The first magnet set 50 includes a first magnet 510 and a second magnet 520 which have opposite magnetic poles. The second magnet set 60 includes a third magnet 610 and a fourth magnet 620 which have opposite magnetic poles. The first magnet 510 and the third magnet 610 have the same magnetic pole, and the second magnet 520 and the fourth magnet 620 have the same magnetic pole. For example, in this embodiment, the first magnet 510 and the third magnet 610 both are South poles, and the second magnet 520 and the fourth magnet 620 both are North poles, but the present invention is not limited thereto. Thus, when the first magnet 510 is placed near the second magnet 520 or the fourth magnet 620, or when the third magnet 610 is placed near the second magnet 520 or the fourth magnet 620, the two magnets having opposite poles can attract each other.

In more detail, the first magnet 510 and the third magnet 610 are located in the main bead 110 and located close to the first side 11, and the wireless power receiving module 410 is located between the first magnet 510 and the third magnet 610. In addition, the first magnet 510 and the third magnet 610 are arranged symmetrically with respect to a bead hole H of the main bead 110. Thus, when the main bead 110 is rotated about the bead hole H (the bead hole H can be taken as a rotation axis of the main bead 110), the first magnet 510, the third magnet 610 and the wireless power receiving module 410 would be rotated about the bead hole H.

In the other hand, the second magnet 520 and the fourth magnet 620 are located in the seat 30 and located close to the supporting surface 31, and the wireless power transmitting module 420 is located between the second magnet 520 and the fourth magnet 620.

Then, to the third magnet set 70, it includes a fifth magnet 710 and a sixth magnet 720 which have the same magnetic pole. In this embodiment, the fifth magnet 710, the sixth magnet 720, the second magnet 520 and the fourth magnet 620 have the same magnetic pole, e.g. North poles. Thus, when the fifth magnet 710 is placed near the second magnet 520 or the fourth magnet 620, or when the sixth magnet 720 is placed near the second magnet 520 or the fourth magnet 620, the two magnets having the same pole repel each other.

In detail, the fifth magnet 710 and the sixth magnet 720 are located in the main bead 110 and located closed to the second side 12. In more detail, the fifth magnet 710 and the sixth magnet 720 are arranged symmetrically with respect to the bead hole H (or the rotation axis) of the main bead 110, and the fifth magnet 710 and the sixth magnet 720 are respectively opposite to the first magnet 510 and the third magnet 610. Thus, when the main bead 110 is rotated about the bead hole H, the fifth magnet 710 and the sixth magnet 720 would be rotated about the bead hole H.

In one case as shown in FIG. 4, when it is attempted to place the main bead 110 in the accommodating space S1, the first magnet 510 and the second magnet 520 attract each other via a magnetic attraction force therebetween, the third magnet 610 and the fourth magnet 620 attract each other via a magnetic attraction force therebetween, and these magnetic attraction forces are able to correctly position the main bead 110 on the seat 30. Ideally, when the main bead 110 is fixed in position via the magnetic attraction forces provided by the first magnet set 50 and the second magnet set 60, the wireless power receiving module 410 is substantially in parallel to the wireless power transmitting module 420, and the wireless power receiving module 410 and the wireless power transmitting module 420 are able to form the wirelessly charging loop for wirelessly charging the main bead 110. That is, by the magnetic attraction forces provided by the first magnet set 50 and the second magnet set 60, the main bead 110 can be positioned in the charging position.

It is worth to note that the main bead 110 can be repositioned by the first magnet set 50 and/or the second magnet set 60 when the main bead 110 is not placed as it is in FIG. 4.

Figure 6:
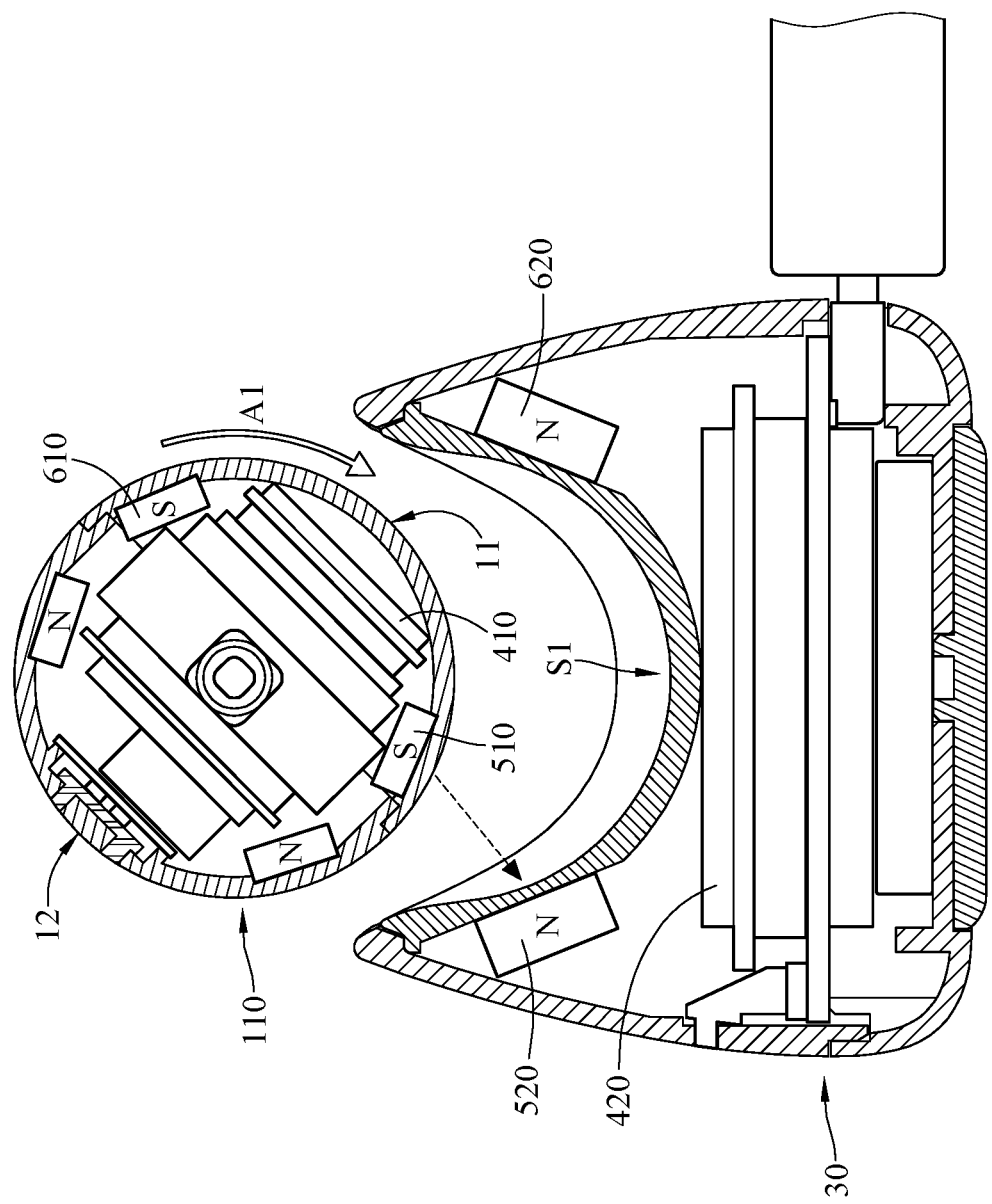
FIG. 6 is another scenario diagram showing that the intelligent electronic product is attempted to be charged.

For example, please refer to FIG. 6, FIG. 6 is another scenario diagram showing that the intelligent electronic product is attempted to be charged. As shown in FIG. 6, when the main bead 110 is in an undesired position and is attempted to be placed into the accommodating space S1, the wireless power receiving module 410 and the wireless power transmitting module 420 are not aligned with each other, and the wireless power receiving module 410 and the wireless power transmitting module 420 are separated by a distance larger than the predetermined distance to cause the main bead 110 to be in the non-charging position, but fortunately, the main bead 110 would be repositioned to the charging position by the magnetic attraction force provided by the first magnet 510 and the second magnet 520 along a direction A1. As a result, the main bead 110 still can be fixed in the position as shown in FIG. 4. It is understood that the main bead 110 can be automatically repositioned to the charging position from the non-charging position through the magnetic attraction force provided by the first magnet set 50 and/or the second magnet set 60.

Furthermore, when the main bead 110 is in an incorrect position or an upside down position and is attempted to be placed in the accommodating space S1, the third magnet set 70 can help to reposition the main bead 110.

Figure 7:
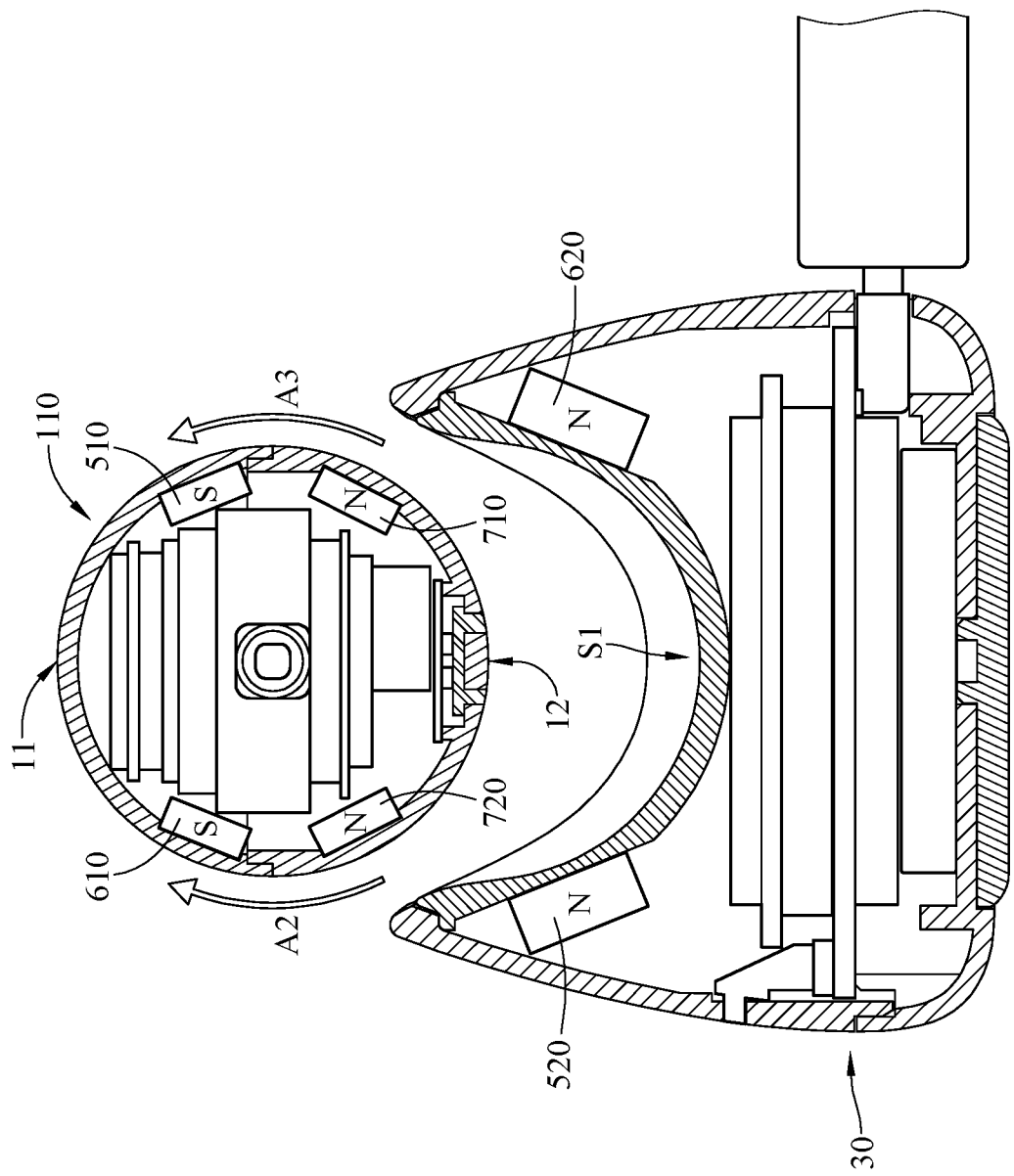
FIG. 7 is yet another scenario diagram showing that the intelligent electronic product is attempted to be charged.

For example, as shown in FIG. 7, FIG. 7 is yet another scenario diagram showing that the intelligent electronic product is attempted to be charged. As shown in FIG. 7, the fifth magnet 710 and the sixth magnet 720 of the third magnet set 70, the first magnet 510 and the fourth magnet 620 have the same magnetic pole, so when the main bead 110 is about to be placed in the accommodating space S1 with the second side 12 facing toward the seat 30, there will be a magnetic repelling force provided by the third magnet set 70 and the first magnet 510 and/or the fourth magnet 620 to rotate the main bead 110 either in a direction A2 or a direction A3. As a result, the main bead 110 can be automatically repositioned to the charging position as shown in FIG. 4 from the non-charging position.

As such, the first magnet set 50, the second magnet set 60 and the third magnet set 70 are able to make it easier for the users to correctly place the wearable device in position for wireless charging and can prevent the problem that the wearable device 10 stops charging due to incorrect positioning.

Comparing to the conventional wearable electronic products that are charged by connecting the pogo pins to the contacts on the charging seat, the intelligent electronic product 1 has no need to require the users to place the wearable device 10 in a precise manner.

Moreover, please refer back to FIG. 1 and FIG. 3, the intelligent electronic product 1 further includes a graphic 80 on the surface of the second side 12 of the main bead 110. Specifically, the graphic 80 is substantially located opposite to the wireless power receiving module 410, and the main bead 110 has a hollow structure at the graphic 80, such that the graphic 80 is permeable to light produced by a light source (not shown) inside the main bead 110. As a result, the graphic 80 allows the main bead 110 to provide a light change effect. Also, the light at the graphic 80 is able to indicate the position or the charge status of the main bead 110.

Lastly, the second magnet set 60 and the third magnet set 70 are optional. For example, in some other embodiments, the intelligent electronic product may not have the second magnet set 60 and the third magnet set 70 but only have the first magnet set 50. In addition, the present invention is not limited to the magnetic poles of the magnets in each magnet set, any arrangement of the magnetic poles that can achieve the same results as discussed in the aforementioned scenarios fall within the scope of the present invention.

According to the intelligent electronic product as discussed in above, the main bead is able to be charged in a wireless manner, therefore the main bead can have a clean appearance with no visible charging port, such that the wearable device looks simple and elegant, and the charging device occupies less volume in the main bead, allowing the size of the main bead to be reduced so as to reduce the overall size of the wearable device.

In addition, by the arrangement of the magnet set, the main bead can be automatically repositioned to the corrected position when it was misplaced on the seat. That is, the magnet set can facilitate users to correctly place the wearable device for wireless charging and can prevent the problem that the wearable device stops charging due to incorrect positioning. Also, the main bead can be firmly fixed in place via the magnetic attraction force provided by the magnet set.

It will be apparent to those skilled in the art that various modifications and variations can be made to the present invention. It is intended that the specification and examples be considered as exemplary embodiments only, with a scope of the invention being indicated by the following claims and their equivalents.

What is claimed is:

1. An intelligent electronic product having wireless charging function, comprising:
   a wearable device, comprising a main bead and a plurality of sub-beads, the main bead connected to the plurality of sub-beads so as to form a ring-shaped structure with the plurality of sub-beads;
   a seat, having an accommodating space, and the main bead removably accommodated in the accommodating space;
   a wireless charging device, comprising a wireless power receiving module and a wireless power transmitting module, the wireless power receiving module located in the main bead, and the wireless power transmitting module located in the seat;
   a first magnet set, comprising a first magnet and a second magnet which have opposite magnetic poles, the first magnet located in the main bead, and the second magnet located in the seat and close to the accommodating space; and
   a second magnet set, the second magnet set comprising a third magnet and a fourth magnet which have opposite magnetic poles;
   wherein, when the main bead is accommodated in the accommodating space, the first magnet and the second magnet attract each other so as to position the main bead in a charging position, such that the wireless power receiving module and the wireless power transmitting module form a wirelessly charging loop for wirelessly charging the main bead, the main bead having a first side and a second side opposite to each other, the wireless power receiving module is located close to the first side, and the first magnet is located close to the first side; when the main bead is in the charging position, the first side faces the wireless power transmitting module, the third magnet located in the main bead and close to the first side, the third magnet located opposite to the first magnet, the fourth magnet located in the seat and close to the accommodating space, the fourth magnet located opposite to the second magnet, wherein the third magnet and the first magnet have the same magnetic pole, and the fourth magnet and the second magnet have the same magnetic pole; when the main bead is accommodated in the accommodating space, the first magnet and the second magnet attract each other, and the third magnet and the fourth magnet attract each other, such that the main bead is positioned in the charging position, allowing the wireless power receiving module and the wireless power transmitting module to form the wirelessly charging loop for wirelessly charging the main bead.

2. The intelligent electronic product according to claim 1, wherein the main bead has a rotation axis, and the first magnet and the third magnet are arranged symmetrically with respect to the rotation axis.

3. The intelligent electronic product according to claim 2, further comprising a third magnet set, the third magnet set comprising a fifth magnet and a sixth magnet which have the same magnetic pole, wherein the fifth magnet, the sixth magnet, the second magnet and the fourth magnet have the same magnetic pole, and the fifth magnet and the sixth magnet are closer to the second side than the first magnet and the third magnet; when the main bead is accommodated in the accommodating space and the third magnet set faces the first magnet set, the second magnet and the fourth magnet repel the third magnet set so as to force the main bead to rotate with respect to the seat.

4. The intelligent electronic product according to claim 3, wherein the fifth magnet and the sixth magnet are arranged symmetrically with respect to the rotation axis of the main bead.

5. The intelligent electronic product according to claim 1, wherein the seat has two openings respectively located at two opposite sides of the accommodating space, and each of the openings is located between the main bead and one of the plurality of sub-beads.

6. The intelligent electronic product according to claim 5, wherein a surface of the seat forming the openings is a curved surface.

7. The intelligent electronic product according to claim 1, wherein a width of the wireless power receiving module is less than a width of the wireless power transmitting module.

8. The intelligent electronic product according to claim 1, further comprising a graphic on the second side of the main bead, capable of providing a light change effect.

* * * * *